United States Patent [19]

Nakayama et al.

[11] Patent Number: 5,656,911

[45] Date of Patent: Aug. 12, 1997

[54] CIRCUIT FOR DRIVING PERMANENT-MAGNET SYNCHRONOUS MOTOR USING PROPORTIONAL CONTROLLER

[75] Inventors: Tomoharu Nakayama; Koetsu Fujita, both of Tokyo; Shigenori Kinoshita; Takao Yanase, both of Kanagawa; Masahiko Hanazawa; Shinichiro Kitada, both of Tokyo; Toshio Kikuchi; Takeshi Aso, both of Kanagawa, all of Japan

[73] Assignees: Fuji Electric Company, Kawasaki; Nissan Motor Company, Yokohama, both of Japan

[21] Appl. No.: 575,624

[22] Filed: Dec. 20, 1995

[30] Foreign Application Priority Data

Dec. 27, 1994 [JP] Japan .................................. 6-338035

[51] Int. Cl.$^6$ .............................. H02P 7/06; H02P 5/402; H02K 21/12
[52] U.S. Cl. ........................ 318/718; 318/719; 318/802; 318/806; 318/809; 318/811
[58] Field of Search ........................ 318/720, 139, 318/718, 432, 807, 811, 800, 799, 806, 609, 802, 721, 805, 809, 719, 537, 810, 803, 254, 52; 363/95, 96, 98, 41; 364/494, 483

[56] References Cited

U.S. PATENT DOCUMENTS

| | | | |
|---|---|---|---|
| 4,823,251 | 4/1989 | Kawabata et al. | 363/95 |
| 5,032,771 | 7/1991 | Kerkman et al. | 318/52 |
| 5,038,092 | 8/1991 | Asano et al. | 318/811 |
| 5,140,248 | 8/1992 | Rowan et al. | 318/811 |
| 5,144,564 | 9/1992 | Naidu et al. | 364/494 |
| 5,278,485 | 1/1994 | Kim | 318/802 |
| 5,278,486 | 1/1994 | Kim | 318/811 |
| 5,298,847 | 3/1994 | Kerman et al. | 318/800 |
| 5,329,217 | 7/1994 | Kerkman et al. | 318/811 |
| 5,504,404 | 4/1996 | Tamaki et al. | 318/432 |
| 5,585,709 | 12/1996 | Jansen et al. | 318/807 |

*Primary Examiner*—Paul Ip
*Attorney, Agent, or Firm*—Greer, Burns & Crain Ltd.

[57] ABSTRACT

A driving device controls a permanent-magnet synchronous motor having a permanent magnet in its rotor using a voltage-type inverter supplying drive power for the synchronous motor, makes the torque of the synchronous motor and the d-axis current flowing in the synchronous motor in the direction of the magnetic flux generated by the permanent magnet approach their own command values, and performs weakening field control by decreasing the d-axis current. To perform the above described control without complicated d-axis current command value operations or temperature amendments to motor constants, the driving device includes a proportional controller for outputting a d-axis signal proportional to the deviation between a d-axis current detection value and a d-axis current command value for the motor. A d-axis voltage command value and a q-axis voltage command value are determined according to the d-axis signal and a q-axis signal obtained based on the deviation between a q-axis current detection value, which is a component in the direction normal to the magnetic flux, and the torque command value for the motor. A voltage command vector is obtained from the d-axis voltage command value and the q-axis voltage command value. The voltage command vector is PWM-converted and a voltage-type inverter control signal is generated.

18 Claims, 5 Drawing Sheets

CIRCUIT FOR DRIVING PERMANENT-MAGNET SYNCHRONOUS MOTOR USING PROPORTIONAL CONTROLLER

BACKGROUND OF THE INVENTION

1. Field of the Invention

The present invention relates to a driving device for driving the permanent-magnet synchronous motor with weakening field control using a voltage-type inverter.

2. Description of the Related Art

FIG. 1 shows the conventional driving device for the permanent-magnet synchronous motor.

In FIG. 1, the driving device comprises a direct current power source 1; a voltage-type inverter 2; an electric current detecting unit 3; a permanent-magnet (PM) synchronous motor 4; a magnetic pole position detecting unit 5; a speed detecting unit 6; a control circuit 7 for the voltage-type inverter 2; and a phase voltage detecting unit 8. The voltage-type inverter 2 converts the direct voltage provided by the direct current power source 1 into a phase voltage, and outputs it to the permanent-magnet synchronous motor 4. The electric current provided from the voltage-type inverter 2 to the permanent-magnet synchronous motor 4 is detected by the electric current detecting unit 3. The magnetic pole position detecting unit 5 detects the position of the magnetic pole of the permanent-magnet synchronous motor 4. The speed detecting unit 6 detects the rotation speed of the rotor of the permanent-magnet synchronous motor 4. The phase voltage detecting unit 8 detects the phase voltage provided from the voltage-type inverter 2 to the permanent-magnet synchronous motor 4.

The control circuit 7 generates gate pulse signals $P_u^*$, $P_v^*$, and $P_w^*$ for each phase switching element of the voltage-type inverter 2 based on the torque command $\tau^*$ and outputs them. Described below are the configuration and operation of the control circuit 7.

Assume a d–q coordinate system which is a rotating coordinate system rotating in synchronism with the magnetic flux generated by a permanent magnet, that is, the rotor of the permanent-magnet synchronous motor 4. In the d–q coordinate system, the d axis is a coordinate axis in the magnetic flux direction while the q axis is a coordinate axis in the direction vertical to the d axis.

In the control circuit 7, a 3-phase/2-phase converter 701 converts the phase current detection values $i_u$ and $i_w$ (which are phase current values of the permanent-magnet synchronous motor 4 and are detected by the electric current detecting unit 3) into the direct current detection values $I_d$ and $I_q$ (which are elements in the d–q coordinate system using a magnetic pole position signal θ).

A q-axis current command operating unit 702 converts the torque command $\tau^*$ for control of the torque of the permanent-magnet synchronous motor 4 into the q-axis current command value $I_q^*$ by multiplying the torque command $\tau^*$ by the inverse number $K_T^{-1}$ of the torque coefficient. The deviation between the q-axis current command value $I_q^*$ and the q-axis current detection value $I_q^*$ from the 3-phase/2-phase converter 701 is calculated by an adder 704q.

A d-axis current command operating unit 703 generates the d-axis current command value $I_d^*$ based on the phase voltage detection values $V_U$, $V_V$, and $V_W$ detected by the phase voltage detecting unit 8 and the rotation speed ω of the rotor detected by the speed detecting unit 6. An adder 704d calculates the deviation between the d-axis current command value $I_d^*$ and the d-axis current detection value Id received from the 3-phase/2-phase converter 701.

The deviations output from the adders 704q and 704d are input to the proportional plus integral controllers (PI controller) 705 and 706 in the q-axis current control system and the d-axis current control system respectively for controlling the deviation to be set to zero.

The adders 704q and 704d and proportional plus integral controllers 705 and 706 form direct current control systems for controlling the q-axis current detection value $I_q$ and the d-axis current detection value $I_d$, which are direct current values, to respectively equal the command values $I_q^*$ and $I_d^*$.

The outputs from the controllers 705 and 706 are input to a noninteracting compensation system 707.

In the noninteracting compensation system 707, the voltage drops $RI_d$ and $RI_q$ through the armature resistor R of the permanent-magnet synchronous motor 4, the voltage drops $\omega LI_d$ and $\omega LI_q$ through the synchronous reactance ωL (L indicates a synchronous inductance), and the inverse activation voltage ωø (ø is a magnetic flux as an inverse activation voltage constant) are calculated as compensation terms based on the d-axis current detection value $I_d$, q-axis current detection value $I_q$, and rotation speed ω. These compensation terms are added (as indicated by the symbols shown in the figure) to the outputs of the controllers 705 and 706 to generate the phase voltage command values (d-axis current command value and q-axis current command value) $V_d^*$ and $V_q^*$ of the d–q axis coordinate system.

The voltage command values $V_d^*$ and $V_q^*$ are input to a coordinate converting unit 708 and converted into the voltage command vector V* which has an amplitude |V*| and are represented in the polar coordinate format using an angle β based on the d- and q-axis.

The amplitude |V*| and angle β are input to a pulse-width modulation (PWM) operating unit 709, and a PWM operation is performed using the magnetic pole position signal θ. Thus, the gate pulse signals $P_U^*$, $P_V^*$, and $P_W^*$ are generated for each of the phase switching elements of the inverter 2.

The voltage-type inverter 2 performs the switching operations according to the gate pulse signals $P_U^*$, $P_V^*$, and $P_W^*$ to output the voltage matching the voltage command and drive the permanent-magnet synchronous motor 4.

When the permanent-magnet synchronous motor is driven, only the q-axis current normal to the d-axis current may be introduced with the d-axis set to zero (0) so that all magnetic flux of the permanent-magnet can operate as effective magnetic flux.

However, since the magnetic field of the permanent-magnet synchronous motor is constant, the inductive voltage through the motor becomes higher than the maximum voltage of the inverter if the motor is running at a high speed. As a result, the motor functions as a generator. Thus, the operation speed of the motor is limited.

Therefore, the weakening field control is made to weaken the apparent magnetic field for a high-speed operation by decreasing the negative d-axis current flowing through the motor.

According to the prior art shown in FIG. 1, the d-axis current command value $I_d^*$ is set to zero (0) when the permanent-magnet synchronous motor 4 is driven without performing the weakening field control.

The negative d-axis current flows in the permanent-magnet synchronous motor 4 in a weakened field area where the inductive voltage of the permanent-magnet synchronous motor 4 is higher than the maximum voltage of the voltage-type inverter 2. However, in the circuit of the prior art, the proportional plus integral controller 706 is used in the d-axis current control system. Therefore, if there is a deviation between the d-axis current command value $I_d^*$ and the d-axis current detection value $I_d$, then a signal proportional to the time integration of the deviation is output, and the output of the controller 706 becomes infinite. If the limiter exists at the output terminal of the controller 706, the output does not become infinite, but the controller 706 becomes saturated, thereby preventing an output from being appropriately issued. As a result, the prior art has to set the d-axis current command value $I_d^*$ to a proper negative value.

Thus, in the prior art, the d-axis current command operating unit 703 obtains the d-axis current command value $I_d^*$ by performing an operation according to the following equation (1) using the phase voltage detection values $V_U$, $V_V$, and $V_W$ from the phase voltage detecting unit 8, and the rotation speed ω from the speed detecting unit 6.

$$I_d^* = (RI_q + \omega\phi - V_q)/\omega L \tag{1}$$

The motor constants R, L, and ø in the equation above are normally fixed. However, they vary depending on the temperature. Additionally, since L is much smaller than R and ø, the R and ø vary with the temperature and greatly affect the value of $I_d^*$ when the motor is driven at a low speed, that is, with ω set to a small value. As a result, the d-axis current command value $I_d^*$ is unstable.

As described above about the prior art, the negative d-axis current flows, when the weakening field control is performed, in the current control system provided with the proportional plus integral controller for both d- and q-axes. To prevent the controller from being saturated, the d-axis current command value $I_d^*$ should be calculated by, for example, the equation shown above. Since the motor constant varies depending on the temperature, etc., additional operations are required to obtain a correct result by adjusting the temperature, etc.

Furthermore, the $V_q$ in equation (1) is obtained by converting the phase voltage into the d–q coordinates in the rotating coordinate system. Since massive operations are performed to obtain $V_q$, a high-speed operating unit is required when a microcomputer practically performs the operations. A temperature detecting unit is further required for the temperature correction for the motor constant, and the phase voltage detecting unit 8 is also required to obtain the d-axis current command value $I_d^*$, thus preventing the system from being successfully developed as a small low-cost device.

SUMMARY OF THE INVENTION

The present invention has been developed to solve the above listed problems and aims at providing a small and low-cost driving device including a permanent-magnet synchronous motor.

The driving device according to the present invention controls a voltage-type inverter to drive a permanent-magnet synchronous motor having a permanent magnet in its rotor. It includes a 3-phase/2-phase converter for outputting a d-axis current detection value and q-axis current detection value of the motor; a d-axis proportional controller for outputting a d-axis signal proportional to the deviation between the d-axis current detection value and a d-axis current command value; a q-axis proportional controller for outputting a q-axis signal proportional to the deviation between the q-axis current detection value and a q-axis current command value; and a control signal providing unit for performing weakening field control with the d-axis current in the rotor current set in the negative state by generating a control signal for use in making the d-axis current detection value approach (or become) the d-axis current command value according to the d-axis signal and by providing the control signal for the voltage-type inverter. The d-axis current detection value and q-axis current detection value are the d-axis component and the q-axis component, respectively, of the stator current of the synchronous motor in the d–q coordinate system which rotates in synchronism with the magnetic flux generated by the permanent magnet and has the d-axis in the direction of the magnetic flux and the q-axis normal to the d-axis. In the driving device, the d-axis current command value is set to be zero (0).

The driving device according to the present invention may include a proportional controller in the d-axis current control system of the direct current control system to drive the permanent-magnet synchronous motor and may set the d-axis current command value to a negative value when performing the weakening field control.

Furthermore, the driving device according to the present invention performs a compensating operation using a motor constant, d-axis current detection value, and q-axis current command value when performing the voltage compensating operation on the voltage drop due to the armature resistance and synchronous reactance of the permanent-magnet synchronous motor. The operation result is added to the outputs of the controller of the d-axis current control system and q-axis current control system to generate the d-axis voltage command value and q-axis voltage command value.

The driving device according to the present invention may further include a detecting unit for detecting a direct current voltage of the inverter and a speed detecting unit for the permanent-magnet synchronous motor to read, according to each of detection values from the detecting units, a negative d-axis current command value operated and stored according to the direct current voltage detection value of the inverter and the rotation speed detection value of the permanent-magnet synchronous motor when performing the weakening field control.

Additionally, the driving device according to the present invention may reduce the proportional gain of the proportional controller of the d-axis current control system in the weakening field control process to set the gain smaller than that in the processes other than the weakening field control process.

The driving device according to the present invention may further include a proportional plus integral controller in the q-axis current control system in the direct current control system, and a proportional plus integral controller in the d-axis current control system switchable to and from the proportional controller. The proportional plus integral controller may be switched to the proportional controller when performing the weakening field control.

The driving device according to the present invention may further include a coordinate converting unit for converting the d-axis voltage command value and q-axis voltage command value output from the direct current control system into the voltage command vectors in the polar coordinates indicated with amplitude and angle; and a limiter for limiting the amplitude of the voltage command vector. With the configuration, the driving device detects that the amplitude of the voltage Command vector has reached the limit value indicated by the limiter and determines that the weakening field control should be performed.

The driving device according to the present invention may also detect that the d-axis current detection value has become a negative value equal to or smaller than a predetermined value and determine that the weakening field control should be performed.

Each aspect of the present invention is described by referring to FIG. 2. It is assumed that the impedance of the motor is limited to a synchronous inductance L.

In FIG. 2, the inductive voltage vector of the motor is represented by E, the voltage command vector by V, the current vector by I, and the d- and the q-axis components of the current vector by $I_d$ and $I_q$ respectively. The circle formed by broken lines in FIG. 2 indicates the locus of the maximum voltage vector output by the inverter.

Since the current vector I generated by the potential difference jωL between the inductive voltage vector E and the voltage command vector V contains a negative d-axis component, the negative d-axis current flows through the motor.

As the proportional controller is used in the d-axis current control system according to the present invention, the d-axis current does not become zero (0) because of the steady deviation of the proportional controller and the negative d-axis current flows continuously even if the d-axis current command value is zero (0). Thus, the weakening field control can be performed with the d-axis current command value set to zero (0).

When the proportional controller is used in the d-axis current control system, the weakening field control can be performed with the d-axis current command value set to zero (0). However, the weakening field control can hardly yield sufficient torque precision with the motor because the q-axis current receives an influence of the deviation of the d-axis current. Accordingly, the present invention can provide a negative d-axis current command value to reduce the deviation of the d-axis current to successfully enhance the torque precision of the motor.

The voltage drop due to the armature resistance and synchronous reactance of the permanent-magnet synchronous motor is compensated for by performing the voltage compensation (non-interacting compensation) on the d- and q-axis voltage command value. If the compensation is realized through the P controller in the d-axis current control system using the d-axis current detection value and q-axis current detection value obtained by converting the coordinates of the current detected by the current detecting unit using the magnetic pole position signal detected by the magnetic position detecting unit, then the voltage compensation term (non-interacting compensation) is affected by the steady deviation of the d-axis current, thereby causing a d-axis current deviation.

According to the present invention, the d-axis current deviation can be reduced by performing the voltage compensation using the q-axis current command value and d-axis current detection value.

Since the motor is controlled using the d-axis current command value obtained by, for example, the approximation equation, using a direct current detection value and a rotation speed detection value according to the present invention, the precision of the motor torque can be maintained in a specified range while applying a negative d-axis current.

The present invention can be designed such that the proportional gain of the proportional controller in the d-axis current control system is variable and can be smaller in the weakening field control process than in other processes. As a result, negative proper d-axis current flows in the weakening field control process, and the steady deviation between the d-axis current command value and the d-axis current detection value can be reduced in other processes, thereby enhancing the precision of the torque in the normal control process and properly performing the weakening field control.

Furthermore, the steady deviation between the d-axis current command value and d-axis current detection value can be reduced in the processes other than the weakening field control process by using the proportional plus integral controller as a controller for the d-axis current control system according to the present invention. In the weakening field control process, the proportional controller is used as a d-axis current control system to allow the negative d-axis current to flow so that the weakening field control can be appropriately performed.

When the amplitude of the voltage command vector reaches the maximum output voltage, the negative current flows through the d-axis and the weakening field control is required. Therefore, the present invention can determine that the weakening field control should be started when the amplitude of the voltage command vector reaches the limit value (for example, the maximum output voltage) indicated by the limiter.

The present invention further determines that the weakening field control should be started when the detection value of the d-axis current is equal to or smaller than a predetermined value while checking the level of the d-axis current.

DESCRIPTION OF THE PREFERRED EMBODIMENT

Figure 3:
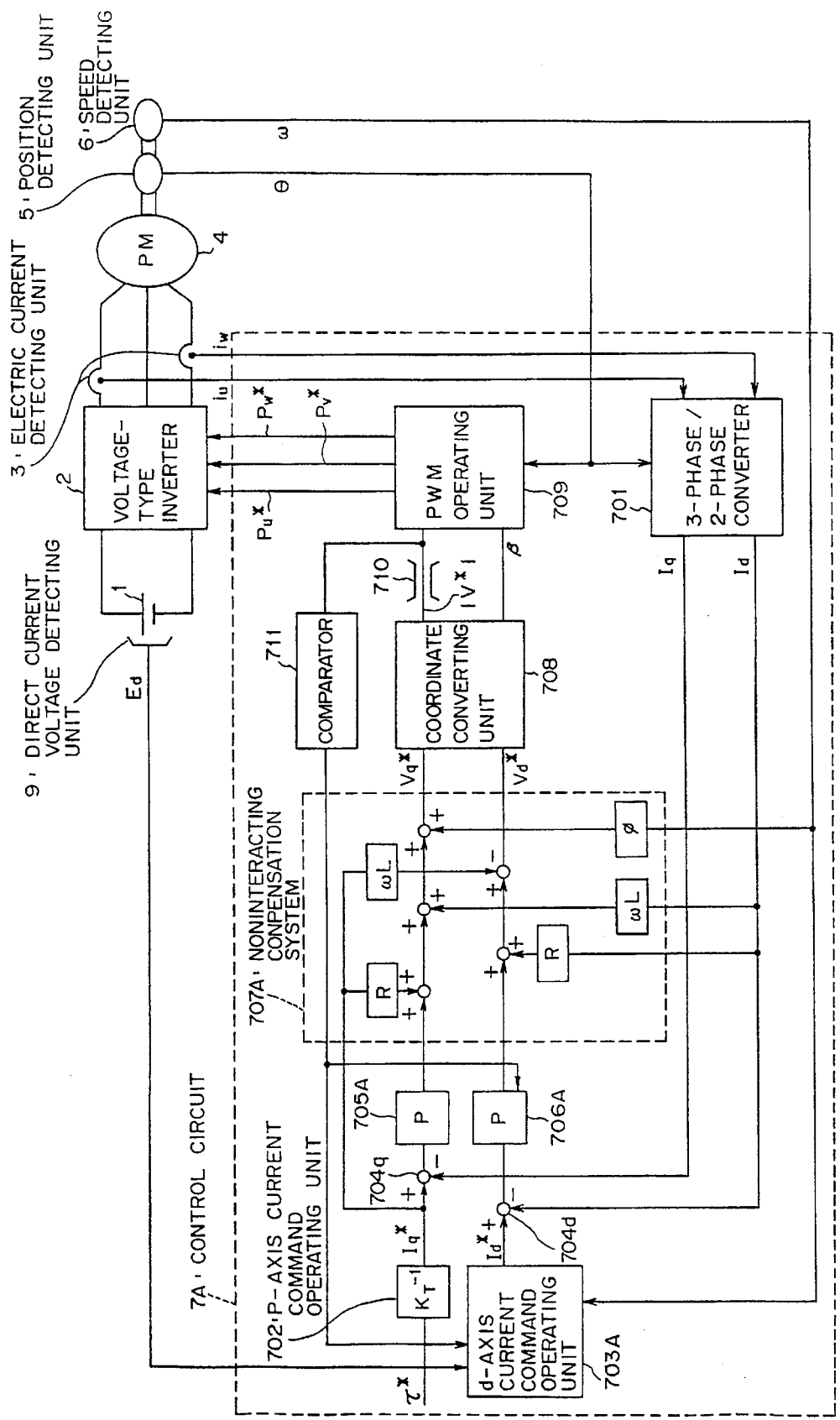
FIG. 3 is a block diagram showing the configuration according to the first embodiment of the present invention.
Figure 4:
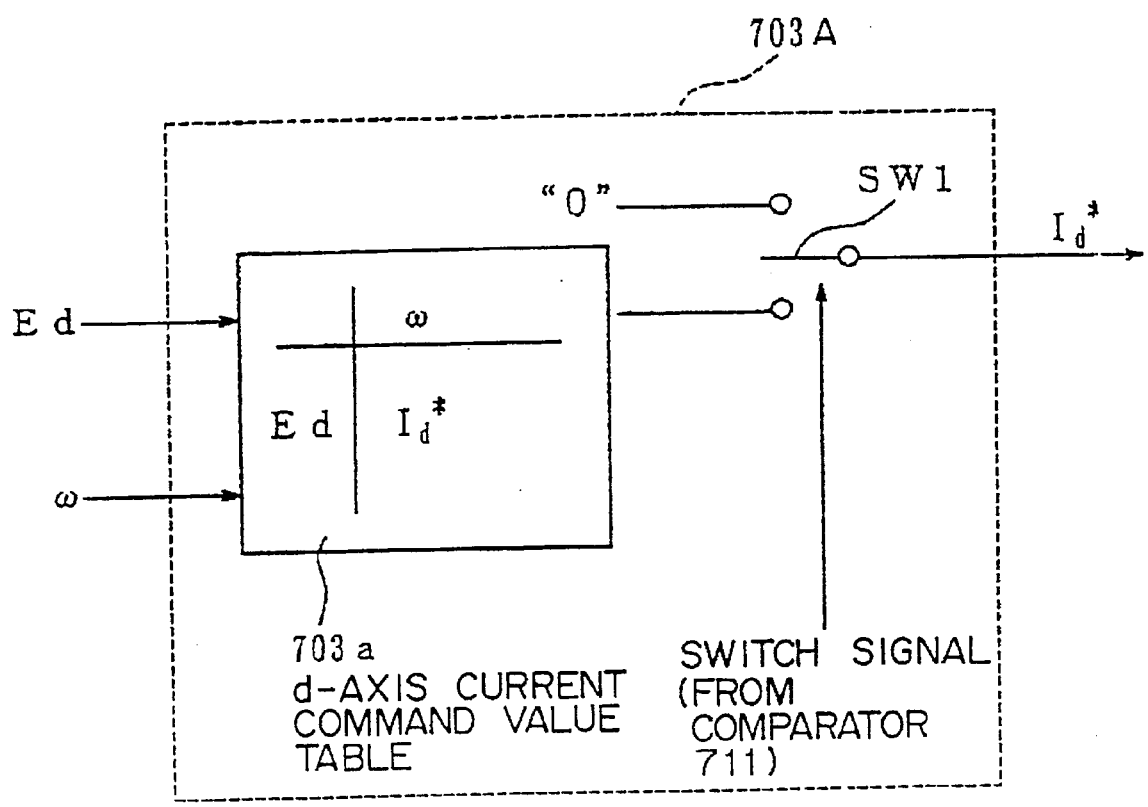
FIG. 4 shows the d-axis current command operating unit in FIG. 3.
Figure 5:
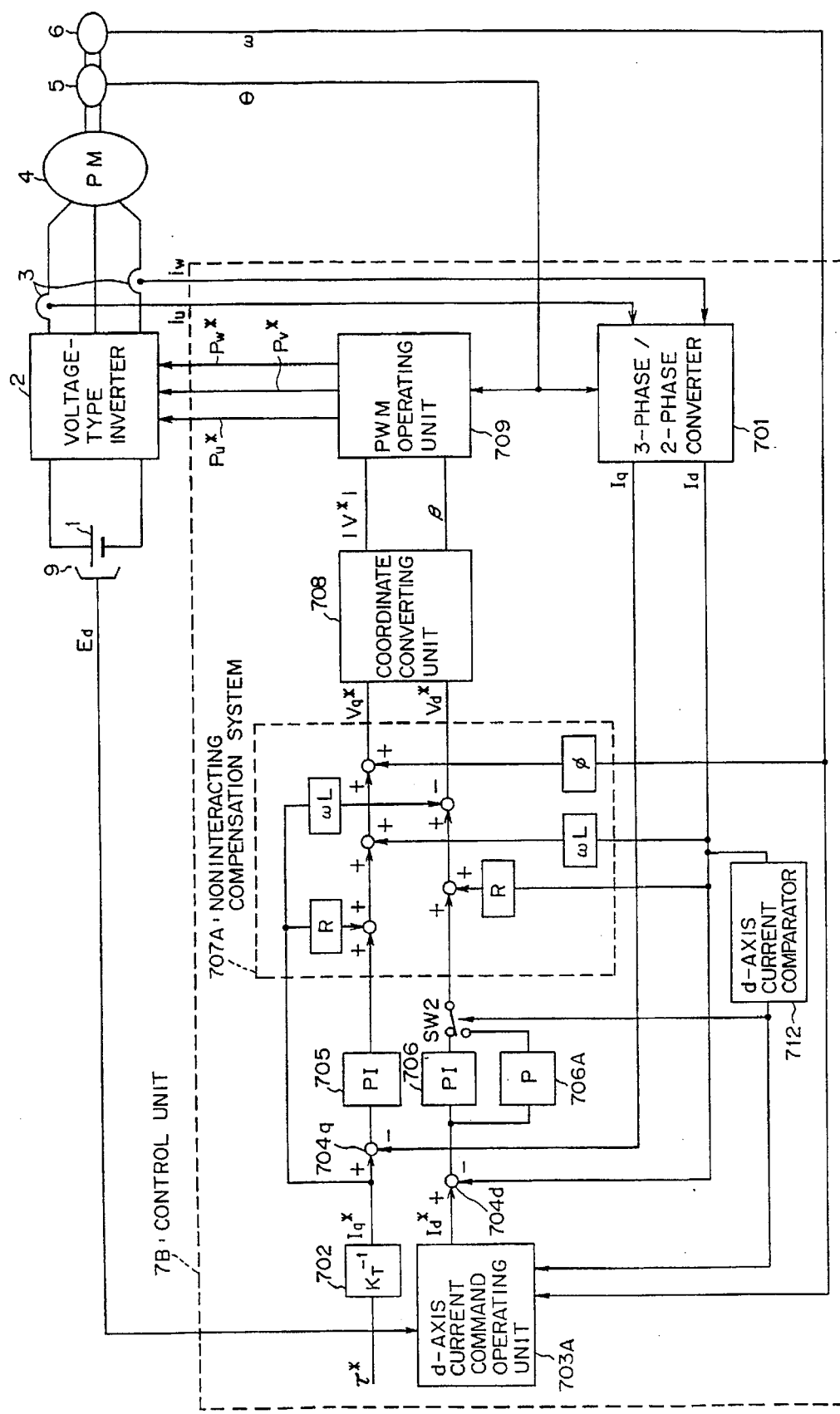
FIG. 5 is a block diagram showing the configuration according to the second embodiment of the present invention.

The embodiments of the present invention are described by referring to FIGS. 3 through 5.

Figure 1:
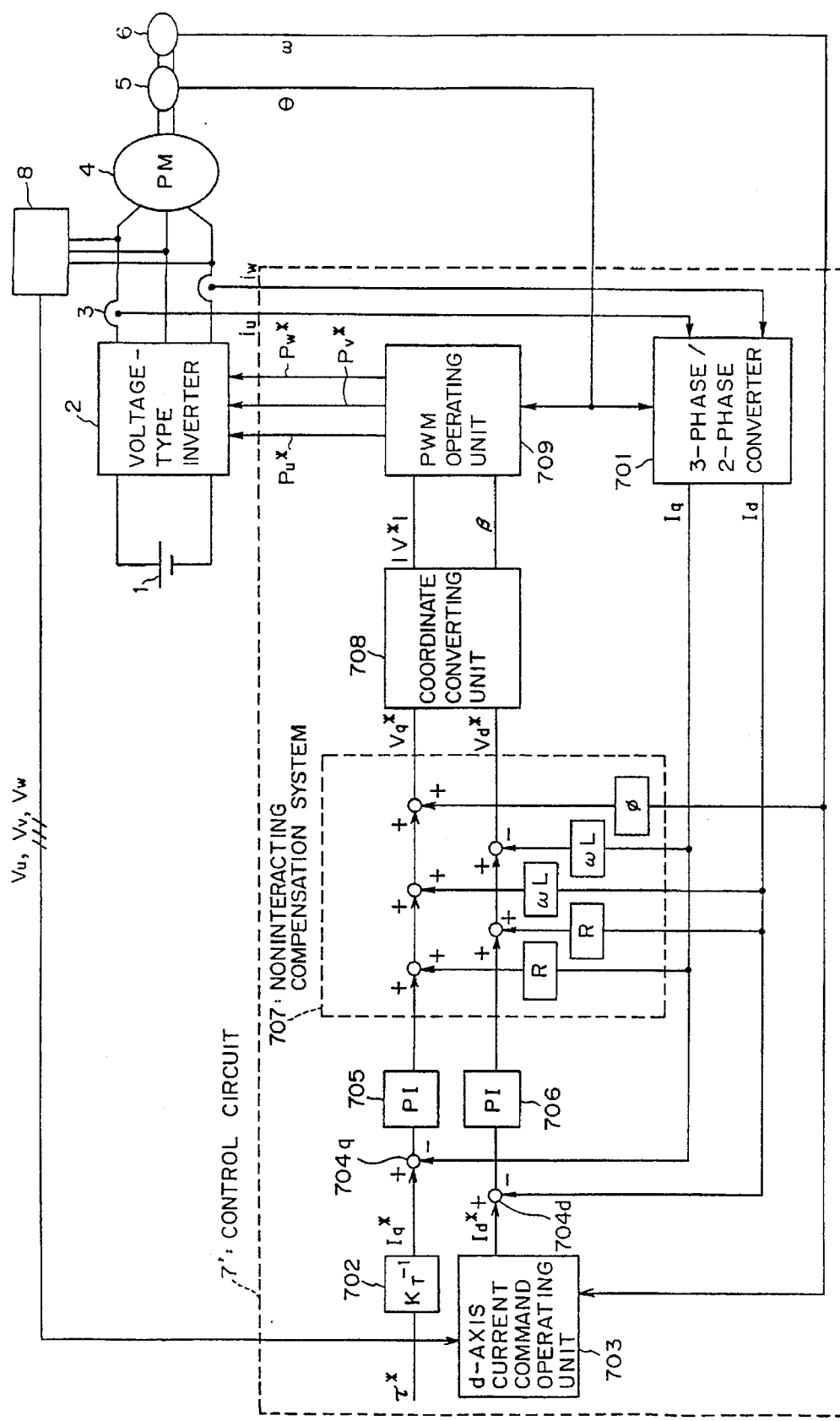
FIG. 1 is a block diagram showing the conventional driving device for the permanent-magnet synchronous motor.

FIG. 3 is a block diagram showing the configuration according to the first embodiment of the present invention. Components of the present embodiment having the same functions as those in FIG. 1 are assigned the same reference numbers and the detailed explanations are omitted.

The device according to the present embodiment comprises the direct current power source 1; the voltage-type inverter 2; the electric current detecting unit 3; the permanent-magnet synchronous motor 4; the magnetic pole position detecting unit 5; the speed detecting unit 6; the control circuit 7A for the voltage-type inverter 2; and a direct current voltage detecting unit 9.

The direct current voltage detecting unit 9 detects the current voltage $E_d$ of the direct current power source 1. The detected current voltage $E_d$ (direct current voltage detection value) is input to the d-axis current command operating unit 703A of the control circuit 7A. According to the present embodiment, the phase voltage detecting unit 8 shown in FIG. 1 can be removed from the system.

The control circuit 7A comprises the 3-phase/2-phase converter 701; the q-axis current command operating unit 702; the d-axis current command operating unit 703A; adders 704q and 704d; the proportional controllers 705A and 706A; the noninteracting compensation system 707A; the coordinate converting unit 708; the PWM operating unit 709; a limiter 710; and a comparator 711.

In the q- and d-axis current control systems in the control circuit 7A, the proportional controllers 705A and 706A are used as current controllers. In the noninteracting compensation system 707A, the voltage drop due to the armature resistance R and synchronous reactance $\omega L$ is compensated using the q-axis current command value $I_q^*$ and the d-axis current detection value $I_d$.

The limiter 710 provided at the output side of the coordinate converting unit 708 limits the amplitude $|V^*|$ of the voltage command vector $V^*$ obtained by the coordinate converting unit 708 to the maximum output voltage value of the voltage-type inverter 2. The comparator 711 compares the amplitude $|V^*|$ with the limit value (maximum output voltage value) provided by the limiter 710 and sends a signal to the d-axis current command operating unit 703 and the proportional controller 706A.

FIG. 4 shows the configuration of the d-axis current command operating unit 703A. The d-axis current command operating unit 703A comprises a 2-dimensional d-axis current command value table 703a, to which the direct current source voltage $E_d$ and the rotation speed $\omega$ of the rotor of the motor 4 are input; and a switch SW1 for switching the d-axis current command value. The switch SW1 switches the negative d-axis current command value $I_d^*$ ($I_d^*<0$) read from the d-axis current command value table 703a with the d-axis current command value $I_d^*$ of zero (0) ($I_d^*=0$) according to the switch signal received from the comparator 711.

The negative d-axis current command value $I_d^*$, which is the contents of the d-axis current command value table 703a, is stored after being calculated by the following equation (2).

$$I_d^* = -A \cdot \omega + B \cdot E_d + C \tag{2}$$

In the equation above, A, B, and C are positive constants and the equation is an approximate equation effective in predetermined ranges of the rotation speed $\omega$ and direct current voltage $E_d$. The constants A, B, and C are determined by adjusting the d-axis current command value $I_d^*$ using the rotation speed $\omega$ and/or the direct current voltage $E_d$ as a parameter so that the torque precision can actually be within a specified range in the weakened field area. These constants are obtained by a primary approximation by sampling each parameter and a plurality of generated d-axis current command values $I_d^*$. As a result, the d-axis current command value $I_d^*$ can be necessarily set to a negative value.

Described below is the operation of the first embodiment. First, the q-axis current command operating unit 702 multiplies the torque command $\tau^*$ by the inverse number $K_T^{-1}$ of the torque coefficient $K_T$ to obtain the q-axis current command value $I_q^*$ *as a resultant product. The torque command $\tau^*$ is used to determine the output torque of the motor 4, and is used to control the speed by a speed control unit when the speed control unit is used as the controller for the motor. However, the controller is not limited to a speed control unit, but other types of torque controllers can be used. The above described torque coefficient $K_T$ is* a proportional coefficient defined by the equation $T=K_T \cdot I_q$ where T indicates the torque and $I_q$ indicates the q-axis current.

The direct current voltage detection value $E_d$ and the rotation speed $\omega$ are input to the d-axis current command operating unit 703A. However, $I_d^*$ equals zero (0) regardless of the values of $E_d$ and $\omega$ until the amplitude $|V^*|$ of the voltage command vector $V^*$ reaches the limit value defined by the limiter 710 in the comparator 711 because the switch SW1 shown in FIG. 4 is connected to the terminal of "0".

If the amplitude $|V^*|$ has reached the limit value defined by the limiter 710, then the comparator 711 detects it and switches the switch SW1 shown in FIG. 4 to the terminal of the d-axis current command value table 703a and outputs a negative d-axis current command value $I_d^*$ read from the values of $E_d$ and $\omega$, so as to enhance the torque control precision.

The phase current detection values $i_U$ and $i_W$ detected by the electric current detecting unit 3 are converted by the 3-phase/2-phase converter 701 into the q-axis current detection value $I_q$ and the d-axis current detection value $I_d$ of the d–q coordinate system.

The adders 704q and 704d calculate the deviation between each command value and detection value. The deviation is output after being multiplied by a proportional gain by the proportional controllers 705A and 706A.

Figure 2:
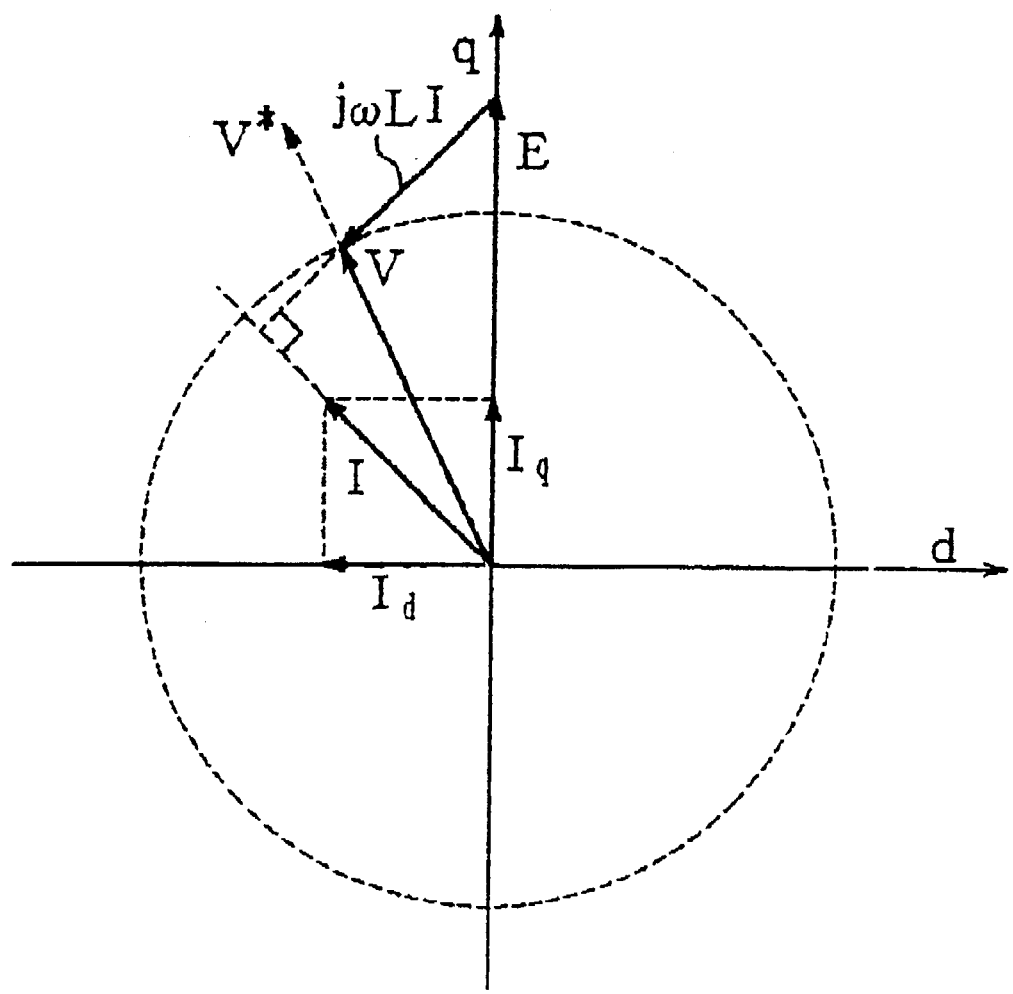
FIG. 2 illustrates the operations of the present invention.

Since the proportional controllers 705A and 706A are used in the q- and d-axis current control systems according to the present embodiment, there are deviations in the differences between the q-axis current command value $I_q^*$ and the q-axis current detection value $I_q$ and between the d-axis current command value $I_d^*$ and the d-axis current detection value $I_d$, the current flows in the negative direction of the d-axis when $I_d^*=0$ as shown in FIG. 2, thereby realizing the weakening field control.

That is, the weakening field control can be performed regardless of the d-axis current command value, that is, without performing the d-axis current command operation.

The torque of the motor is proportional to the q-axis current. By the voltage current equation and voltage command equation, the relationship between the the q-axis current command value $I_q^*$ and q-axis current detection value $I_q$ is represented by the equation (3) using the gain K of the proportional controller.

$$I_q = I_q^* + K \cdot (I_d^* - I_d) \tag{3}$$

The second term of the right part of the equation indicates the deviation of the d-axis current. If this term is zero (0), then the right part (q-axis current command value) equals the lesser part (q-axis current) and the torque command matches the output torque. However, if it is not zero (0), then the q-axis current deviation occurs, thereby lowering the torque control performance.

If the amplitude $|V^*|$ of the voltage command vector $V^*$ has reached the limit value defined by the limiter 710, then an appropriate negative d-axis current command value $I_d^*$ can be read from the d-axis current command value table 703a in the weakening field control according to the switch signal output from the comparator 711 of the present invention, thereby improving the torque precision much more than when $I_d^*=0$.

The gain of the proportional controller 706A may also be controlled to decrease with the increase of the amplitude $|V^*|$ of the voltage command vector $V^*$ detected by the comparator 711. Thus, more d-axis current can be introduced in the negative direction to effectuate the weakening field control.

The noninteracting compensation system 707A performs a compensating operation using the motor constants R, L, and $\phi$, the q-axis current command value $I_q^*$, the d-axis current detection value $I_d^*$, and the rotation speed $\omega$. The operation result is added to the outputs of the proportional controllers 705A and 706A as represented by the symbols shown in the drawings, to obtain the q-axis voltage command value $V_{q^*\ and\ the\ d\text{-}axis\ is\ voltage\ command\ value\ Vd}^*$.

The q-axis voltage command value $V_q^*$ and the d-axis voltage command value $V_d^*$ of the rotating d-q coordinate system are converted into the amplitude |V*| of the voltage command vector V* and angle β by the coordinate converting unit 708, and are input to the PWM operating unit 709.

The PWM operating unit 709 performs the PWM operation using the magnetic pole position signal θ received from the magnetic pole position detecting unit 5 to generate gate pulse signals $P_U^*$, $P_V^*$, and $P_W^*$ for the switching elements of the inverter 2.

The inverter 2 switches the direct current according to the gate pulse signals $P_U^*$, $P_V^*$, and $P_W^*$, and drives the permanent-magnet synchronous motor 4 by outputting an appropriate AC voltage.

The second embodiment of the present invention is described by referring to FIG. 5. The components having the same functions as those of the device shown in FIGS. 1 and 3 are assigned the same reference numbers and the detailed explanations are omitted here.

The device according to the present invention comprises the direct current power source 1; the voltage-type inverter 2; the electric current detecting unit 3; permanent-magnet synchronous motor 4; the magnetic pole position detecting unit 5; the speed detecting unit 6; the control circuit 7B for the inverter 2; and the direct current voltage detecting unit 9.

The control circuit 7B comprises the 3-phase/2-phase converter 701; the q-axis current command operating unit 702; the d-axis current command operating unit 703A; adders 704q and 704d; the proportional plus integral controllers 705 and 706; the proportional controller 706A; switch SW2; the noninteracting compensation system 707A; coordinate converting unit 708; the PWM operating unit 709; and d-axis current comparator 712.

In the control circuit 7B, the q-axis current control system comprises the proportional plus integral controller 705. The d-axis current control system switches the proportional controller 706A with the proportional plus integral controller 706 using the switch SW2 respectively for the weakening field control process and other processes.

According to the present embodiment, the switch of the weakening field control can be performed not according to the amplitude |V*| of the voltage command vector V* as in the first embodiment shown in FIG. 3, but according to the value of d-axis current detection value $I_d$ detected by the d-axis current comparator 712.

The d-axis current comparator 712 determines that the system is in the weakened field area only if the d-axis current detection value $I_d$ exceeds a predetermined negative value, and outputs a detection signal to the switch SW2. The switch SW2 switches the proportional controller 706A with the proportional plus integral controller 706 according to the detection signal.

The d-axis current comparator 712 can also be used for the switch SW1 in the first embodiment. In this case, the d-axis current command value is switched by the d-axis current command operating unit 703A in the first embodiment not according to the signal from the comparator 711, but according to the signal from the d-axis current comparator 712.

Since the proportional plus integral controller 705 is used in the q-axis current control system according to the present embodiment, the steady deviation of the output from the controller 705 is zero (0). The d-axis current control system switches the switch SW2 to operate the proportional controller 706A when the d-axis current comparator 712 determines that the system is in the weakened field control area. As a result, the d-axis current can be introduced in the negative direction without saturating the controller when the d-axis current command value $I_d^*$ indicates either zero (0) or a negative value.

During processes other than the weakening field control process, the switch SW2 is switched to the terminal of the proportional plus integral controller 706, thereby realizing the similar operation performed by the conventional device shown in FIG. 1.

Since the proportional controller is used in the d-axis current control system according to the present invention, the weakening field control can be performed with the d-axis current command value set to zero (0) without performing a complicated d-axis current command value operation. Therefore, a small-size driving device can be designed without a temperature detecting unit or a phase voltage detecting unit used to amend the motor constants without affecting the speed or cost required by the operating unit.

According to the present invention, the torque precision of a motor can be further improved by using the proportional controller and setting the d-axis current command value to a negative value in the weakening field control process.

Furthermore, according to the present invention, the steady deviation caused by a proportional controller used in the d-axis current control system can be reduced by using the d-axis current detection value and the q-axis current command value in the voltage compensation using a motor constant.

Since the d-axis current command value can be used after being read from the table on which the d-axis current command value is preliminarily calculated and stored, the weakening field control can be performed so that the torque precision can be within a specified range without performing a complicated d-axis current command value operation.

According to the present invention, the steady deviation can be reduced in processes other than the weakening field control to enhance the torque precision by reducing the proportional gain of the proportional controller in the d-axis current control system down to a value smaller than in the weakening field control process when the weakening field control is performed.

Furthermore, according to the present invention, the proportional controller is used in the d-axis current control system only in the weakening field control process and the proportional plus integral controller is used in a non-weakening field control process, thereby furthermore improving the torque precision in processes other than the weakening field control process.

The present invention can correctly determine the timing of control operations by detecting that the amplitude of the voltage command vector has reached a limit value defined by the limiter or that the d-axis current detection value has become a value equal to or smaller than a predetermined value, and then by determining that the weakening field control process should be started.

What is claimed is:

1. A driving device for driving a permanent-magnet synchronous motor having a permanent magnet in a rotor by controlling a voltage-type inverter, comprising:

output means for outputting a d-axis current detection value indicating a d-axis component of a stator current of the synchronous motor in a q–d coordinate system which rotates in synchronism with a magnetic flux generated by the permanent-magnet and has a d-axis in a direction of the magnetic flux and a q-axis normal to the d-axis;

d-axis proportional control means for outputting a d-axis signal proportional to a deviation between the d-axis current detection value and a d-axis current command value; and control signal providing means for performing weakening field control, when a d-axis current of the stator current is in a negative state, by generating a control signal for making the d-axis current detection value approach the d-axis current command value according to the d-axis signal, and by providing the control signal to the voltage-type inverter.

2. The driving device according to claim 1, wherein said d-axis current command value is set to zero (0) to perform the weakening field control.

3. The driving device according to claim 1, wherein said d-axis current command value is set to a negative value to perform the weakening field control.

4. The driving device according to claim 1 further comprising:

q-axis proportional control means for outputting a q-axis signal proportional to a deviation between a q-axis current detection value indicating a q-axis component of the stator current of the synchronous motor and a q-axis current command value; and non-interacting compensation means for performing a compensating operation using a motor constant of the motor, the d-axis current detection value, and the 1 q-axis current command value when performing a voltage compensating operation on a voltage drop due to armature resistance and synchronous reactance of the permanent-magnet synchronous motor, and for generating a d-axis voltage command value and a q-axis voltage command value by adding an operation result of the compensating operation to the d-axis signal and q-axis signal, wherein said inverter is controlled according to the d-axis voltage command value and q-axis voltage command value.

5. The driving device according to claim 4 further comprising:

table means for storing a plurality of d-axis current command value candidates corresponding to a plurality of direct current voltages provided for said inverter and a plurality of rotation speeds of the rotor of the synchronous motor; and switch means for switching the d-axis current command value from zero to one of a plurality of d-axis current command values read from said table means according to a detected direct current voltage and rotation speed when the weakening field control starts.

6. The driving device according to claim 5 further comprising:

coordinate converting means for converting the d-axis voltage command value and the q-axis voltage command value into a voltage command vector represented by polar coordinates using an amplitude and an angle;

limiter means for limiting the amplitude of the voltage command vector; and comparing means for switching said switch means when the amplitude of the voltage command vector reaches a limit value defined by said limiter means.

7. The driving device according to claim 1, wherein a gain of said d-axis proportional control means is reduced during the weakening field control to a value smaller than a gain in processes other than a weakening field control process.

8. The driving device according to claim 1 further comprising:

q-axis proportional plus integral control means for outputting a q-axis signal proportional to a time integration of a deviation between a q-axis current detection value and a q-axis current command value;

d-axis proportional plus integral control means, switchable with said d-axis proportional control means, for outputting a d-axis signal proportional to a time integration of a deviation between the d-axis current detection value and the d-axis current command value; and switch means for switching said d-axis proportional plus integral control means to said d-axis proportional control means when the weakening field control starts.

9. The driving device according to claim 7 further comprising:

d-axis current comparing means for switching said switch means when detecting that the d-axis current detection value becomes a negative value equal to or smaller than a predetermined value.

10. A method for controlling a permanent-magnet synchronous motor having a permanent magnet in a rotor by controlling a voltage-type inverter and performing weakening field control by decreasing a d-axis current in a direction of a magnetic flux generated by the permanent magnet in the permanent-magnet synchronous motor, comprising:

a first step of detecting a d-axis current detection value, which is a direction value of the d-axis current and a q-axis current detection value, which is a detection value of a current component in a direction normal to the magnetic flux;

a second step of outputting a d-axis signal proportional to a deviation between the d-axis current detection value and a d-axis current command value for the motor;

a third step of outputting a q-axis signal proportional to a deviation between the q-axis current detection value and a torque command value for the motor;

a fourth step of determining a d-axis voltage command value and a q-axis voltage command value respectively according to the d-axis signal and the q-axis signal;

a fifth step of converting the d-axis voltage command value and the q-axis voltage command value into a voltage command vector in a polar coordinate format using an angle and amplitude; and a sixth step of controlling the voltage-type inverter by performing a PWM conversion on the voltage command vector.

11. The controlling method according to claim 10, wherein said d-axis current command value is set to zero to perform the weakening field control.

12. The controlling method according to claim 10, wherein said d-axis current command value is set to a negative value to perform the weakening field control when the amplitude of the voltage command vector is equal to or larger than a predetermined value.

13. The controlling method according to claim 10 further comprising:

a step of performing a compensating operation for a voltage drop due to armature resistance and synchronous reactance of the permanent-magnet synchronous motor using a motor constant of the motor, the d-axis current detection value, and the q-axis current command value, and for generating a d-axis voltage command value and a q-axis voltage command value by adding an operation result of the compensating operation to the d-axis signal and the q-axis signal.

14. The controlling method according to claim 10, wherein said d-axis current command value is switched from zero to one of a plurality of negative d-axis current command values stored in table means when the amplitude of the voltage command vector is equal to or larger than a predetermined value.

15. The controlling method according to claim 10, wherein a gain of the d-axis signal in said second step is reduced with increasing an amplitude of the voltage command vector.

16. A method for controlling a permanent-magnet synchronous motor having a permanent magnet in a rotor by controlling a voltage-type inverter and performing weakening field control by decreasing a d-axis current in a direction of a magnetic flux generated by the permanent magnet in the permanent-magnet synchronous motor, comprising:

a first step of detecting, a d-axis current detection value, which is a direction value of the d-axis current, and a q-axis current detection value, which is a detection value of a current component in a direction normal to the magnetic flux;

a second step of outputting a d-axis signal proportional to a time integration value of a deviation between the d-axis current detection value and a d-axis current command value for the motor when the d-axis current detection value is equal to or smaller than a predetermined value, and outputting the d-axis signal proportional to the deviation between the d-axis current detection value and the d-axis current command value when the d-axis current detection value exceeds the predetermined value;

a third step of outputting a q-axis signal proportional to time integration of a deviation between the q-axis current detection value and a torque command value for the motor;

a fourth step of determining a d-axis voltage command value and a q-axis voltage command value respectively according to the d-axis signal and, the q-axis signal;

a fifth step of converting the d-axis voltage command value and the q-axis voltage command value into a voltage command vector in a polar coordinate format using an angle and amplitude; and a sixth step of controlling the voltage-type inverter by performing a PWM conversion on the voltage command vector.

17. A device for controlling a permanent-magnet synchronous motor having a permanent magnet in a rotor by controlling a voltage-type inverter and performing weakening field control by decreasing a d-axis current in a direction of a magnetic flux generated by the permanent magnet in the permanent-magnet synchronous motor, comprising:

proportional control means for outputting, a d-axis signal proportional to a deviation between a d-axis current detection value which is a component in a direction of the magnetic flux generated by the permanent magnet and a d-axis current command value for the motor;

compensating means for determining a d-axis voltage command value and a q-axis voltage command value using the d-axis signal and a q-axis signal obtained based on a deviation between a q-axis current detection value which is a component in a direction normal to the magnetic flux and a torque command value for the motor;

coordinate converting means for converting the d-axis voltage command value and the q-axis voltage command value into a voltage command vector in a polar coordinate format using an angle and amplitude; and operating means for generating a signal for use in controlling the voltage-type inverter by performing a PWM conversion on the voltage command vector.

18. A device for controlling a permanent-magnet synchronous motor, comprising:

a permanent-magnet synchronous motor comprising a permanent magnet in a rotor;

a voltage-type inverter for supplying drive power for the synchronous motor; and a control device for performing weakening field control by controlling the voltage-type inverter to decrease a d-axis current in the permanent-magnet synchronous motor in a direction of a magnetic flux generated by the permanent magnet, comprising:

proportional control means for outputting a d-axis signal proportional to a deviation between a d-axis current detection value which is a component in a direction of the magnetic flux generated by the permanent magnet and a d-axis current command value for the motor;

compensating means for determining a d-axis voltage command value and a q-axis voltage command value using the d-axis signal and a q-axis signal obtained based on a deviation between a q-axis current detection value which is a component in a direction normal to the magnetic flux and a torque command value for the motor;

coordinate converting means for converting the d-axis voltage command value and the q-axis voltage command value into a voltage command vector in a polar coordinate format using an angle and amplitude; and operating means for generating a signal for use in controlling the voltage-type inverter by performing a PWM conversion on the voltage command vector.

* * * * *

UNITED STATES PATENT AND TRADEMARK OFFICE
CERTIFICATE OF CORRECTION

PATENT NO. : 5,656,911
DATED : August 12, 1997
INVENTOR(S) : Nakayama et al.

It is certified that error appears in the above-identified patent and that said Letters Patent is hereby corrected as shown below:

Column 7, lines 64-67 - Column 8, line 1-2, please correct the subscript typeface to normal typeface .

Column 9, line 8, please correct the subscript typeface to normal typeface.

UNITED STATES PATENT AND TRADEMARK OFFICE
CERTIFICATE OF CORRECTION

PATENT NO. : 5,656,911
DATED : August 12, 1997
INVENTOR(S) : Nakayama et al.

It is certified that error appears in the above-indentified patent and that said Letters Patent is hereby corrected as shown below:

Column 11, line 33, delete "1".

Column 11, line 41, before "q-axis" insert --the--.

Column 11, line 43, before "q-axis" insert --the--.

Column 13, line 48, after "and" delete ",".

Signed and Sealed this

Sixteenth Day of December, 1997

*Attest:*

*Attesting Officer*

BRUCE LEHMAN

*Commissioner of Patents and Trademarks*